United States Patent [19]

Rudzyanskas et al.

[11] Patent Number: 4,483,074
[45] Date of Patent: Nov. 20, 1984

[54] METHOD FOR LOCATING A POINT BY ITS COORDINATES AND A DEVICE FOR ACCOMPLISHING SAME

[75] Inventors: Juozas P. Rudzyanskas; Galina J. Rudzyanskaite, both of Kaunas, U.S.S.R.

[73] Assignee: Kaunassky Politekhnichesky Institut Imeni A. Snechkusa, Kaunas, U.S.S.R.

[21] Appl. No.: 414,336
[22] PCT Filed: Dec. 18, 1980
[86] PCT No.: PCT/SU80/00200
§ 371 Date: Aug. 13, 1982
§ 102(e) Date: Aug. 13, 1982
[87] PCT Pub. No.: WO82/02018
PCT Pub. Date: Jun. 24, 1982

[51] Int. Cl.³ .............................................. G01B 5/03
[52] U.S. Cl. .................................. 33/1 M; 33/1 CC; 33/25 R
[58] Field of Search .......... 33/1 M, 1 R, 30 G, 1 MP, 33/1 CC, 25 R, 25 C

[56] References Cited
FOREIGN PATENT DOCUMENTS
1210353 10/1970 United Kingdom ................. 33/1 M OTHER PUBLICATIONS
U.S.S.R. Academy of Sciences, Collection of papers on Mechanics of Machines, No. 33–36, Nauka Publishers, Moscow, 1972, A. G. Ovakimov, An Analytical Method for Determining the Values of Velocity and Acceleration of Space Mechanisms with Several Degrees of Freedom, (in Russian, pp. 45–62), (presented on May 6, 1968).

Primary Examiner—William D. Martin, Jr.
Attorney, Agent, or Firm—Robert E. Burns; Emmanuel J. Lobato; Bruce L. Adams

[57] ABSTRACT

A device and method for locating a point with preset coordinates x and y in an orthogonal system of coordinates with an X and a Y axes. The device has a planetary train kinematically connected to a mechanical arm via a single four-link parallelogram. The mechanical arm is kinetically connected to another four-link parallelogram. The planetary train is provided with a body and a carrier having a rotation axle pivotally secured in the body. The axle provides a center of the orthogonal system of coordinates around which is moved, through an angle $\beta$, is a point which is a base point for locating a sought-for point with preset coordinates x and y in the orthogonal system of coordinates. The planetary train further includes a satellite gear rigidly connected to the carrier rotation axle and has its own rotation axle that serves as a center of an angular turn, through an axle $\alpha$ of a point which represents the base point. A pin having at its center the base point, is rigidly connected to the satellite gear rotation axile. The mechanical arm is pivoted on the pin.

21 Claims, 8 Drawing Figures

METHOD FOR LOCATING A POINT BY ITS COORDINATES AND A DEVICE FOR ACCOMPLISHING SAME

FIELD OF THE INVENTION

The present invention relates to the field of mechanical engineering and, more particularly, it relates to methods for locating a point by its coordinates and to devices for accomplishing such methods.

This invention can be used most advantageously in instrument making, in printing and copying, in measuring equipment and robot making, in hoisting and transport equipment and the like for the orientation of objects on a plane and in space, for example, when making and measuring several holes in a part being machined, in automatic replacement of tools in machines and in transfer and removal of parts from equipment, as well as in automating assembly and auxiliary operations.

DESCRIPTION OF THE PRIOR ART

There are known in the art methods for locating points by coordinates thereof, employed in machine tool manufacture, measuring equipment, in mechanical engineering and instrument making, as well as for the reproduction of data from microfiche, wherein the location of preset points, i.e., the positioning of points on a plane, for example, upon machining or measuring parts, is effected by way of two rectilinear movements in preset orthogonal coordinates (cf., A. N. Rabinovich, Sistema upravleniya avtomaticheskikh mashin - System for Control over Automatic Machines, Tekhnika Publishers, Moscow, pp. 254–261).

Also known in the art is a method for locating a point by its coordinates in a plane and a device for accomplishing the method, wherein positioning is effected with the aid of a carriage driven by an individual drive to move in longitudinal guides of slide rails which, in turn, are movable in transverse guides of a base (cf., U.S. Pat. No. 3,765,755, granted in 1973).

In this latter prior art method and device, a preset point is located with the aid of two interperpendicular rectilinear movements which can only be effected if an intermediate link, such as slide rails, is used in the device. The accuracy of coordinate movements at the time of positioning depends upon the accuracy of the frame of reference used, as well as on the rectilinearity and interperpendicularity of the rectilinear displacement guides of the carriage and slide rails. The guides must provide for strict rectilinearity of movement of movable elements in horizontal and vertical planes. It is only on this condition that the values of coordinate movements at all points in the positioning plane, associated with the moving carriage, will be equal to the values of movements measured by the frames of reference of the device. For increasing the stiffness of the slide rails, their height is increased, this causing a simultaneous increase of error in the vertical plane.

The existing methods for locating a point by positioning are characterized by long drive chains, and by the presence of slack in the carriage movement chains. In order to eliminate the effect of long chains and slack on the accuracy of setting the carriage, the feed of the latter should always be effected in one and the same direction (always approaching the preset point from one side). With a view to saving the time required to move the carriage to extreme positions or to a more remote coordinate, high rates of the carriage movement in both directions have to be developed. It is impractical to maintain high rates of movement until the carriage arrives at the end position since the resulting forces of inertia cause an overtravel of the carriage far beyond the required limit or develop undesirable stresses in the table-and-part feed chain.

This necessitates a deceleration of the carriage travel prior to stopping. Therefore, provision is made for a stepped rate of carriage travel, namely, faster travel over most of the carriage path and slower (for accurate setting) travel over the remaining small portion, required for the carriage to reach the end position. The transition from higher to lower rate of travel is gradual rather than instantaneous, involving two-, three- and even a four-step variation of the travel rate. Different rates of travel upon accelerated and adjustment movement are attained with the aid of special devices. The cross-head guide design suffers from large dimensions and is hard to assemble. More difficulties are caused by the arrangement of individual devices which need to be mounted on slide rails, this causes a further increase of the overall dimensions.

Another problem resides in the automation of carriage travel through the use of systems of programmed control, inasmuch as the conveying means of the drives cannot serve the feedback functions, and, therefore, in the case of using programmed control, the requisite technical devices are to be complemented with two frames of reference for feedback, which cannot be properly accommodated without increasing the overall dimensions accordingly.

There are other known methods for locating a point by its coordinates in space that are used in machine tool manufacture, in measuring equipment, in mechanical engineering, instrument making and robot manufacture, as well as in hoisting and transport equipment, wherein the location of preset points, i.e., the positioning of points in space, upon machining, measuring of transferring parts, is effected by way of three rectilinear movements in preset orthogonal coordinates, or by a combination of other movements necessarily including the use of rectilinear movement with respect to at least one coordinate (cf., A. I. Yakushev, Vzaimozameniayemost, standartizatsiya i tekhnicheskiye izmereniya - Interchangeability, Standardization and Technical Measurements, Mashinostroiyeniye Publishers, Moscow, 1974, pp. 108–123).

There is known a device for locating a point, comprising a stationary base and a driven mechanical arm. By its one end, the arm is coupled to the base via a planetary train. The planetary train includes a satellite gear and a carrier having a rotation axle secured in the body of the planetary train (cf., A. E. Korbrinksky et al., Printsipy postroiyeniya dvigatelnoi sistemy avtomaticheskikh manipuliatorov s programmnym upravleniyem /promyshlennykh robotov/ - Principles of Building up the Motive System of Program-Controlled Automatic Manipulators /Industrial Robots/, Stanki i instrumenty- Journal of Machines and Machine Tools, No. 4, 1976, p. 5, FIG. 6).

The arm is made up of several interarticulated links. Power motors are positioned on the base and connected to the arm links by kinematic transmission.

The provision of a planetary train with complex kinematic coupling between the angles of rotation of power motor shafts and relative angles of rotation of arm skeleton links causes difficulties in programming, because the grip loses its preset oriented position upon rotation of one of the arm links. In addition, long kinematic chains will inevitably suffer from increased slack and, consequently, lower accuracy.

DISCLOSURE OF THE INVENTION

The present invention is aimed at solving the problem of developing a method for locating a point by its coordinates and a device for accomplishing such method, which method and device, owing to the use of rotary motions alone in the course of positioning, would help reduce the time required for the process of positioning and simplify the kinematic couplings used in the device.

The problem set is solved with the aid of a method for locating a point with preset coordinates in an orthogonal system, wherein a base point is selected on one of the coordinate axes and positioned by being moved along a conditional trajectory depending upon the coordinates of the preset point, and wherein, according to the invention, the positioning of the point is performed using polar coordinates along, one of said coordinates being determined from the formula $$\alpha = 2 \text{ arc cos} \frac{\sqrt{x^2 + y^2}}{2r}$$

and another one - from the formula $$\beta = \text{arc cos} \frac{\sqrt{x^2 + y^2}}{2r} \text{ arc tan} \frac{x}{y}$$

where
- $\alpha$ - angle of rotation of the point being positioned around a center located at the middle of a segment between the center of the orthogonal system of coordinates and base point;
- $\beta$ - angle of rotation of the point being positioned around the center of the orthogonal system of coordinates between the center of the orthogonal system of coordinates and base point;
- x - abscissa of the orthogonal system of coordinates;
- y - ordinate of the orthogonal system of coordinates;
- r - radius of a circle whose center is located at the middle of a segment between the center of the orthogonal system of coordinates and base point, and, in the course of positioning, the point being positioned is moved in accordance with the angles $\alpha$ and $\beta$ relative to, respectively, a point located at the middle of a segment between the center of orthogonal system of coordinates and base point, and the center of the orthogonal system of coordinates.

Such an arrangement helps obviate the performance of rectilinear translatory movements in the horizontal and vertical planes and, owing to this, improve the accuracy of locating the point and reduce the time required for the process of positioning.

It is expedient, in case the sought-for point is arranged at some distance from the preset plane accommodating the X- and Y-axes of the orthogonal system, that a third coordinate of the point be additionally preset, as well as an axis of rotation passing through the center of the orthogonal system of coordinates and a point located at the middle of a segment between said center and the point being positioned, the positioning of said point involving the use of a third polar coordinate found from the formula $$\gamma = \text{arc tan } z/x,$$

where
- $\gamma$ - angle of rotation of the point being positioned around an axis passing through the center of the orthogonal system of coordinates and perpendicular to the X-axis;
- z - coordinate of the orthogonal system of coordinates;
- x - abscissa of the orthogonal system of coordinates, and, in the course of positioning, the point is moved in accordance with
angle $\gamma$ about said axis of rotation.

The provision or the third coordinate of the point determined from the additional polar coordinate provides the possibility of positioning the point in space.

Further, the problem posed is solved with the aid of device for accomplishing the afore-mentioned method, comprising a stationary base and a driven mechanical arm coupled to the base via a planetary train including a satellite gear and a carrier having a rotation axle secured in the stationary base, the device, according to the present invention, further comprising rigidly interconnected four-link parallelograms of which one is pivoted to the arm and the other one - to the stationary base, the rotation axle of the carrier passing through the center of orthogonal system of coordinates and being pivotally secured in the stationary base, while to the satellite gear of the planetary train there is rigidly attached a pin articulated to the mechanical arm and designed to ensure the movement of the latter in a plane accommodating the point being positioned.

It is expedient that the device should further comprise an axle passing through the center of the orthogonal system of coordinates at right angles to the rotation axle of the carrier, this former axle accomodates the body of the planetary train, rigidly attached thereto, and is pivoted to the stationary base.

It is likewise expedient that a fork should be rigidly attached to the mechanical arm, through the ends of which fork an axle passes with a possibility of rotation, said axle carrying at the ends thereof rods transmitting to said axle rotation from a drive mounted on the body of the planetary train and also carrying a fork-like mechanical wrist secured by the ends thereof with a possibility of turning relative to said axle until thrust against the fork, said wrist carrying a finger clamp through whose body there passes a link rod having a geometric axis perpendicular to the axle carrying the fork-like wrist and coupled to the wrist for rotation about the geometric axis of the link rod, while the fingers of the clamp are kinematically coupled to the axle carrying the fork-like wrist such as to ensure the possibility of their turning through an angle sufficient for clamping and releasing a part.

It is technically sound for the axle carrying the rods to be mounted in the fork with the aid of antifriction bearings.

It is structurally expedient that the rods be mounted on the axle with the aid of antifriction bearings and eccentric pins rigidly attached to the axle and spaced apart relative to the latter through an angle equal to 90°.

It is possible that the ends of the fork-like wrist be secured on the axle carrying the rods with the aid of antifriction bearings.

In accordance with the present invention, it is expedient that on the fork-like wrist-carrying axle there should be rigidly secured a disk with electromagnetic clutches mounted on the opposite sides thereof, and an eccentric designed to cooperate with one end of the link rod whose other end has a cone-shaped tip designed to affect the finger ends opposite to those serving to clamp the parts and, with a view to ensuring the cooperation of the eccentric with the link rod end, provision is made for springs attached to the finger clamp body and thrust against the finger ends opposite to those serving to clamp the parts.

BRIEF DESCRIPTION OF DRAWINGS

The present invention will be better understood upon considering the following detailed description of an examplary embodiment thereof, with due reference to the accompanying drawings in which.

PREFERRED EMBODIMENT OF THE INVENTION

Inasmuch as the measurement and count of linear quantities over the years used to be much simpler than in the case of angular quantities, sought-for points in a plane are, in the overwhelming majority of cases, preset by linear orthogonal coordinates both for purposes of drawing and for production applications. In recent years, however, owing to the emergence of new angular converter designs capable of measuring angular quantities at a high rate and accuracy, for example, conventional converters generate 81,920 electric pulses per axis revolution and ensure the discreteness of counting to an accuracy of 16 angular seconds, inductosins provide for the discreteness of counting accurate within angular seconds. Such converters have come to be widely used in program-controlled machines for linear measurements. The converters can be used even more conveniently for angular count inasmuch as there is no need to convert angular quantities to angular ones.

Figure 1:
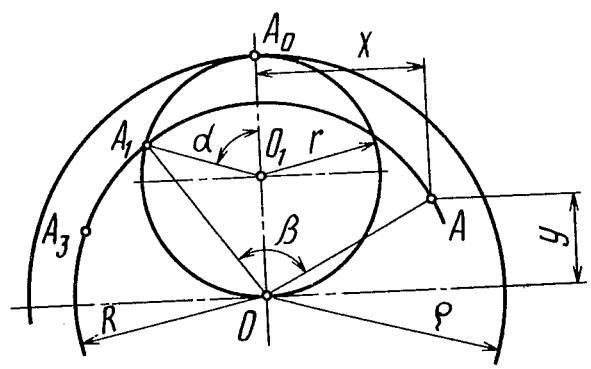
FIG. 1 shows diagrammatically the trajectory of the point being located in the course of its positioning in a plane.

We need to locate a point A (fig. 1) in a plane by preset coordinates X and Y. To this end, we make use of a base point $A_o$ positioned on one of the coordinate axes, say, on the Y-axis, at a distance $\rho$ from a center O of orthogonal system (XOY) of coordinates. The distance $\rho$ is equal to the radius of a preset area of a circle, serviced by the device of the invention. Then, we take a point $O_1$ on the Y-axis, positioned at a distance of $r = \rho/2$ from the center O. Preset coordinates x and y of the point A are converted to polar coordinates $\alpha$ and $\beta$, respectively, according to the formulae where $$\alpha = 2 \text{ arc cos} \frac{\sqrt{x^2 + y^2}}{2r},$$

$$\beta = \text{arc cos} \frac{\sqrt{x^2 + y^2}}{2r} + \text{arc tan} \frac{x}{y}.$$

Further, the point $A_o$ is turned about the center $O_1$ through angle $\alpha$ whereupon the point $A_o$ assumes the position of point $A_1$ positioned at a distance R from the center O.

Then we turn the point $A_1$ about the center O through angle $\beta$, whereupon the point $A_1$ assumes the position A at a distance R from the center O. As a result, we locate the point A in a plane by the preset coordinates x and y, using the base point $A_o$.

Since the radius R may vary in the range of from O to $\rho$, depending upon the angle $\alpha$, the point $A_o$ can be set from the initial fixed position to any point of the area of the circle with the radius $\rho$ by varying the values of $\alpha$ and $\beta$.

The maximum size of the area being serviced is attained at $\rho = 2r$.

Figure 2:
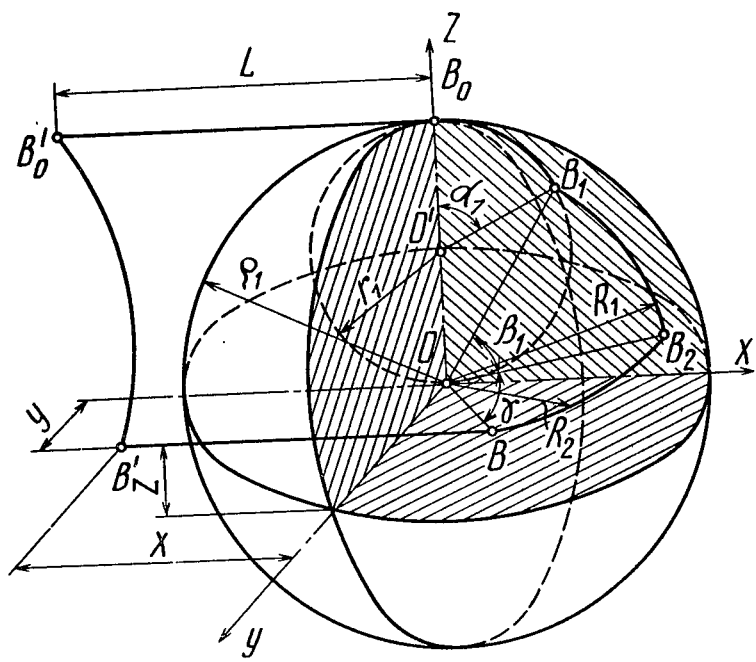
FIG. 2 ditto, in space.

For positioning a point B (FIG. 2) in space with preset coordinates x, y and z, we should perform the following.

Take a base point $B_o$ on the coordinate axis Z at a distance $\rho_1$ from the center O of the orthogonal system of coordinates. The distance $\rho_1$ is equal to the radius of the preset space serviced by the herein disclosed device.

Take a point $O^1$ on the Z-axis, positioned at a distance $r_1 = \rho_1/2$ from the center O. Convert the preset coordinates x, y and z of the point B to polar coordinates $\alpha_1$, $\beta_1$ and $\gamma_1$, respectively, where $$\alpha_1 = 2 \text{ arc cos} \frac{\sqrt{x^2 + y^2}}{2r},$$

$$\beta_1 = \text{arc cos} \frac{\sqrt{x^2 + y^2}}{2r} + \text{arc tan} \frac{x}{y}$$

$$\gamma_1 = \text{arc tan} \frac{z}{x}.$$

After that, the point $B_o$ is turned about the center $0^1$ through angle $\alpha_1$, whereupon the point $B_o$ takes the position of point $B_1$ spaced through a distance $R_1$ from the center O.

The point $B_1$ is turned about the center O through angle $\beta_1$, whereupon the point $B_1$ assumes the position of $B_2$ at a distance $R_1$ from the center O. The point $B_2$ is further turned about the Z-axis in a circle with the center O and radius $R_2 = R_1$ (since $R_2$ is in another plane) through angle $\gamma$, whereupon the point $B_2$ assumes the position of the point B at a distance $R_2$ from the center O.

As a result, we locate the point B in space by the preset coordinates x, y and z, using the base point $B_o$.

The rotation through angles $\alpha$, $\beta$ and $\gamma$ can be effected both successively, as described above, and concurrently.

Since the radius $R_1$ and its positions in the ZOX plane may vary in the range of from zero to $\rho_1$, depending on the angles $\alpha$ and $\beta$, the point $B_o$ can be set from the initial fixed position to any point in space of a sphere with radius $\rho_1$ provided $\rho_1 = 2r_1$, vy varying the values of the angles $\alpha$, $\beta$ and $\gamma$. In case the base point $B_o$ is at a distance L from the selected base point $B_o$, we can find the point $B^1$ being positioned with preset coordinates, consequently, the positioning space increases.

Figure 3:
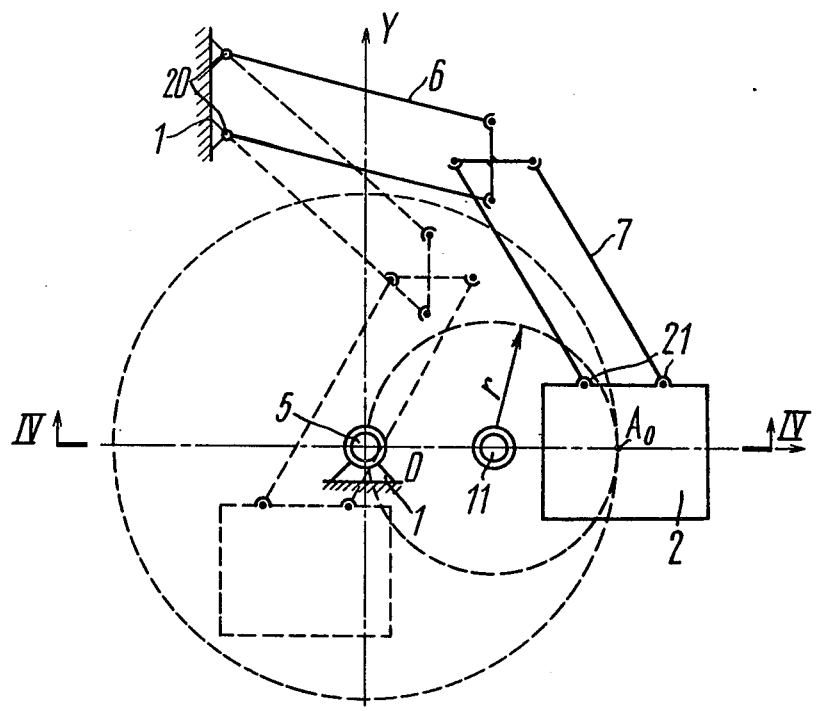
FIG. 3 is a mechanical diagram of the device for positioning a point in a plane, according to the invention.
Figure 4:
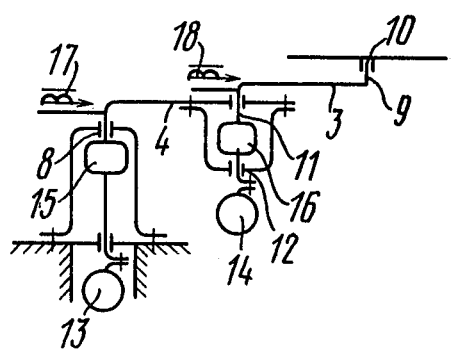
FIG. 4 is a section taken along the line IV—IV of FIG. 3.

Disclosure is made of a device for locating a point A with preset coordinates x and y in an orthogonal system XOY, illustrated in FIGS. 3 and 4 and used, for example, for marking out holes in a plane workpiece placed on a mechanical arm fashioned as a table movable in a horizontal plane such that the point on the part being marked out should coincide with the tip of a marking tool fixedly arranged above the table.

Referring now to FIG. 3 of the accompanying drawings, the herein disclosed device for locating a point in a plane comprises a stationary base 1 and a driven mechanical arm 2 fashioned as a table on which a workpiece to be marked out is placed. The table 2 is coupled with the base 1 via a planetary train including one satellite gear 3 (FIG. 4) and one carrier 4 having a rotation axle 5 (FIG. 3) secured in the body of the planetary train. In the herein described embodiment of the invention, the body of the planetary train is provided by the stationary base 1. According to the invention, the device further comprises rigidly interconnected four-link parallelograms 6 and 7 one of which, 6, is pivoted to the body of the planetary train, i.e., to the stationary base 1, while the other one, 7, is pivoted to the mechanical arm 2.

The rotation axle 5 of the carrier 4 passes through center O of the orthogonal system XOY of coordinates and is pivotally secured in the stationary base 1. For securing the axle 5 in the base 1, use in made of antifriction bearings 8 (FIG. 4). Rigidly attached to the satellite gear 3 of the planetary train is a pin 9 coupled to the arm 2 via antifriction bearings 10 and designed to ensure the movement of the arm 2 in a plane XOY accommodating a point $A_o$ (FIG. 1) being positioned.

The satellite gear 3 has a rotation axle 11 secured on the carrier 4 through the intermediary of antifriction bearings 12. The axles 5 and 11 are provided, respectively, with rotation drives 13 and 14, angular converters 15 and 16 for determining rotation angles $\alpha$ and $\beta$ of the axles 5 and 11 and with electromagnetic clutches 17 and 18 for braking the rotation of the axles 5 and 11.

If, at the time of positioning, several rigidly interconnected single points are to be located by different coordinates, for example, a workpiece is to be machined or measured, such workpiece is secured on the arm 2.

Broken line in FIG. 3 shows the position of the arm 2 at another moment in the course of positioning. For coupling the parallelograms 6 and 7 to the body 1 of the planetary train and, to the arm 2, use is made of bearings 20 and 21, respectively.

Figure 5:
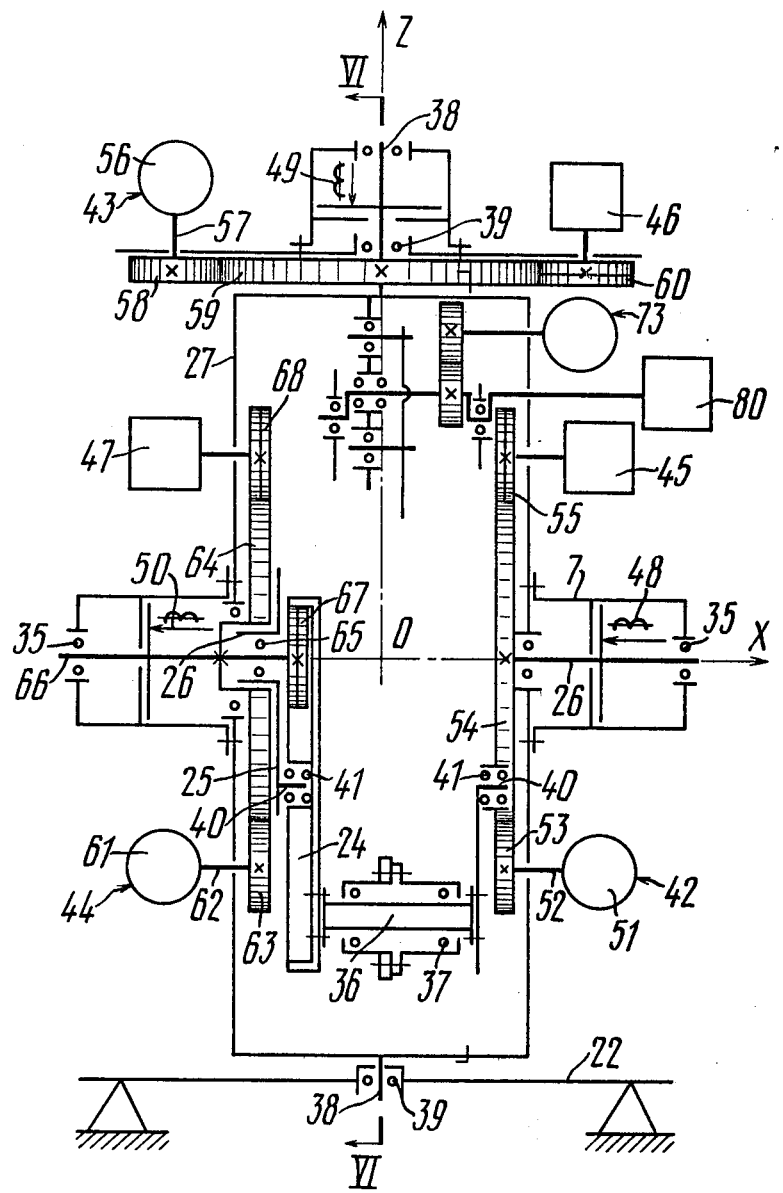
FIG. 5 is a mechanical diagram of the device for positioning a point in space, according to the present invention, in longitudinal section.
Figure 6:
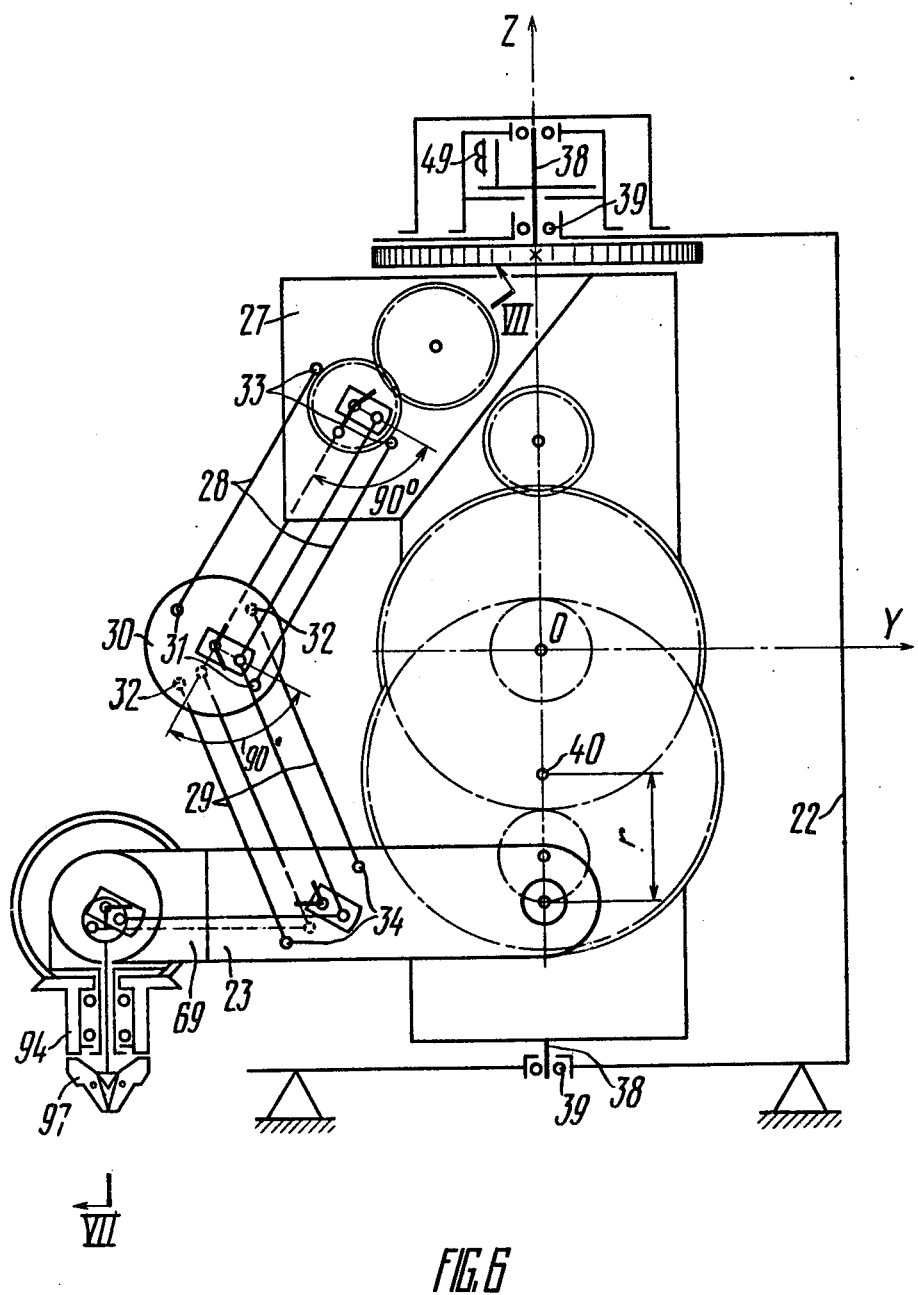
FIG. 6 is a section taken along the line VI—VI of FIG. 5.

The device of the invention for locating a point in space by preset coordinates x, y and z comprises a stationary base 22 (FIG. 5) and a driven mechanical arm 23 (FIG. 6) whose one end is coupled to a planetary gear including one satellite gear 24 (FIG. 5) and one carrier 25 having a rotation axle 26 secured in a body 27 of the planetary train.

According to the invention, the device further comprises rigidly interconnected four-link paralleograms 28 (FIG. 6) and 29. The rigid interconnection of the parallelograms 28 and 29 is ensured by a disk 30 in which one end of each one of the parallelograms 28 and 29 is secured with the aid of respective antifriction bearings 31 and 32. The opposite ends of one of the parallelograms, 28, are connected via antifriction bearings 33 to the body 27 of the planetary train and those of the other parallelogram, 29 - via antifriction bearings 34 to the mechanical arm 23. The rotation axle 26 of the carrier 25 passes through center O of an orthogonal system XYZ (FIG. 5) of coordinates and is secured in the body 27 of the planetary train through the intermediary of antifriction bearings 35.

Rigidly attached to the satellite gear 24 of the planetary train is a pin 36 coupled to the arm 23 via antifriction bearings 37, thereby ensuring the movement of the arm 23 in a plane XOY (FIG. 6) accommodating a point $B_o$ (FIG. 2) being positioned.

The device further comprises an axle 38 (FIGS. 5, 6) passing through the center O of the orthogonal system XYZ of coordinates at right angles to the axle 26 of the carrier 25. The axle 38 is coupled to the stationary base 22 via antifriction bearings 39 and accommodates the body 27 of the planetary train rigidly attached thereto.

The satellite gear 24 has a rotation axle 40 (FIG. 5) secured on the carrier 25 through the intermediary or antifriction bearings 41.

The axles 26, 38 and 40 are provided, respectively, with rotation drives 42, 43 and 44, converters 45, 46 and 47 for determining rotation angles $\beta$, $\gamma$ and $\alpha$ of the axles 26, 38 and 40 and with electromagnetic clutches 48, 49 and 50 for braking the rotation of said axles 26, 38 and 40.

The rotation drive 42 of the axle 26 includes a geared electric motor 51 on whose output shaft 52 there is set a drive gear 53 meshing with a driven gear 54 made fast on the axle 26. The gear 54 is also conjugated with a gear 55 designed to couple the axle 26 with the converter 45.

The rotation drive 43 of the axle 38 includes a geared electric motor 56 on whose output shaft 57 there is set a drive gear 58 meshing with a driven gear 59 made fast on the axle 38 and conjugated with a gear 60 designed to couple the axle 38 with the converter 46.

The rotation drive 44 of the axle 40 includes a geared electric motor 61 on whose output shaft 62 there is set a drive gear 63 meshing with a driven gear 64 coupled via antifriction bearings 65 to the axle 26 of the carrier 25 and made fast on the axle 66. Rigidly attached to the axle 66 is a gear 67 meshing with the satellite gear $\geq$ rigidly set on the axle 40. The converter 47 is coupled to the axle 40 via gear 68 meshing with the gear 64.

Thus, the afore-described structure which possesses three degrees of freedom enables one to locate a point in space by preset coordinates.

With a view of re-orienting said point in space, namely, gripping an object and transferring it from one position to another, the mechanical arm 23 is fashioned such as to additionally possess three more degrees of freedom.

Figure 7:
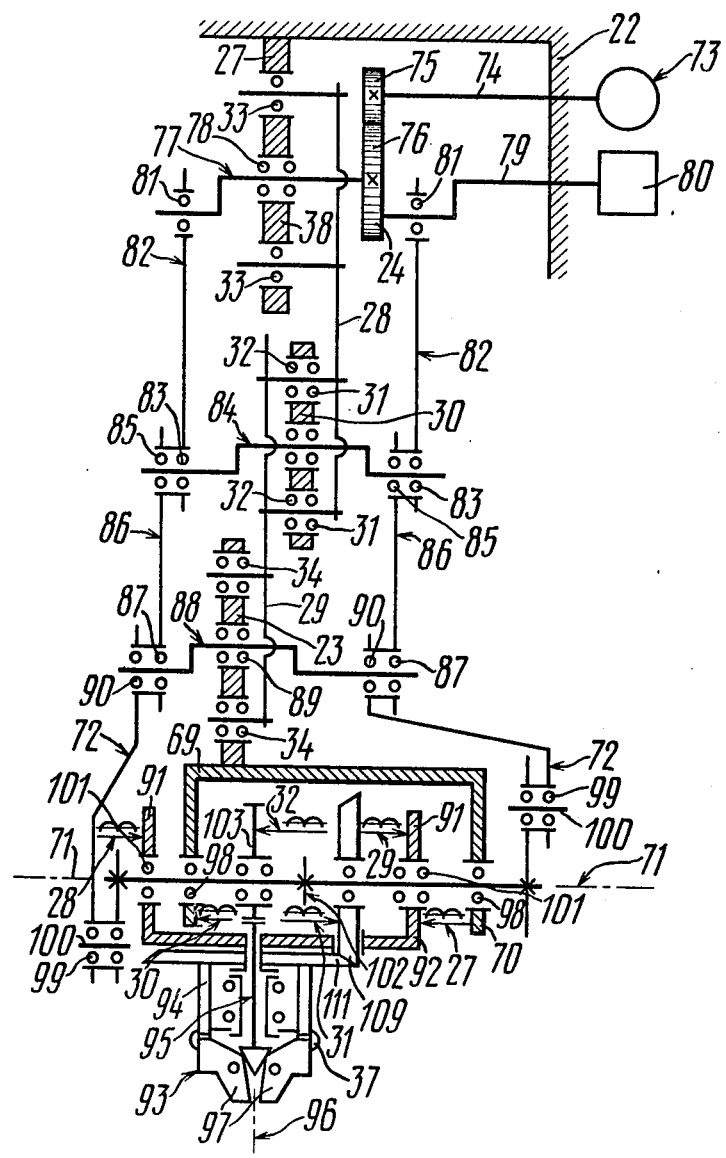
FIG. 7 is a section taken along the line VII—VII of FIG. 6.

To this end, to a free end of the mechanical arm 23 there is rigidly attached a fork 69 (FIG. 7) through whose ends 70 an axle 71 passes with a possibility of rotation. The axle 70 carries at the ends thereof rods 72 serving to transmit to said axle 71 rotation from a drive 73 mounted on the body 27 of the planetary train.

The drive 73 comprises a geared electric motor on whose output shaft 74 there is set a gear 75 meshing with a gear 76. The gear 76 is made fast on a crankshaft 77 which is movably mounted in the body 27 of the planetary train through the intermediary of antifriction bearings 78. The crankshaft 77 is coupled with a shaft 79 of a converter 80 designed for measuring the rotation of the axle 71. In so doing, both ends of the crankshaft 77 are connected to the rods 72 via antifriction bearings 81 set on the crankshaft 77, rods 82, bearings 83, crankshaft 84 secured in the disk 30, bearings 85 set on the shaft 84 and rods 86 coupled via antifriction bearings 87 to a crankshaft 88 mounted on the arm 23 through the intermediary of antifriction bearings 89. Attached to the shaft 88 via bearings 90 are the rods 72.

Secured by its ends 91 on the axle 71 is a fork-like mechanical wrist 92 capable of turning about said axle 71 until thrust against the fork 69.

The fork-like writs 92 is provided with a mechanical finger clamp 93 having a body 94 through which passes a link rod 95 having its geometric axis 96 perpendicular to the axle 71, and fingers 97.

The clamp 93 is coupled to the wrist 92 with a possibility of rotation about the geometric axis 96 of the link rod 95.

The fingers 97 of the clamp 93 are kinematically coupled to the axle 71 such as to ensure the possibility of their turning through an angle sufficient for clamping and releasing a part. The possibility of rotation of the axle 71 in the fork 69 is ensured with the aid of antifriction bearings 98.

The rods 72 are mounted on the axle 71 with the aid of antifriction bearings 99 and eccentric pins 100 rigidly attached to said axle 71 and spaced apart relative to the latter through a angle equal to 90°.

The rotation of the fork-like wrist 92 relative to the axle 71 until thrust against the fork 69 is effected with the aid of antifriction bearings 101 mounted at the ends 91 of the fork-like wrist 92 and secured on the axle 71.

Figure 8:
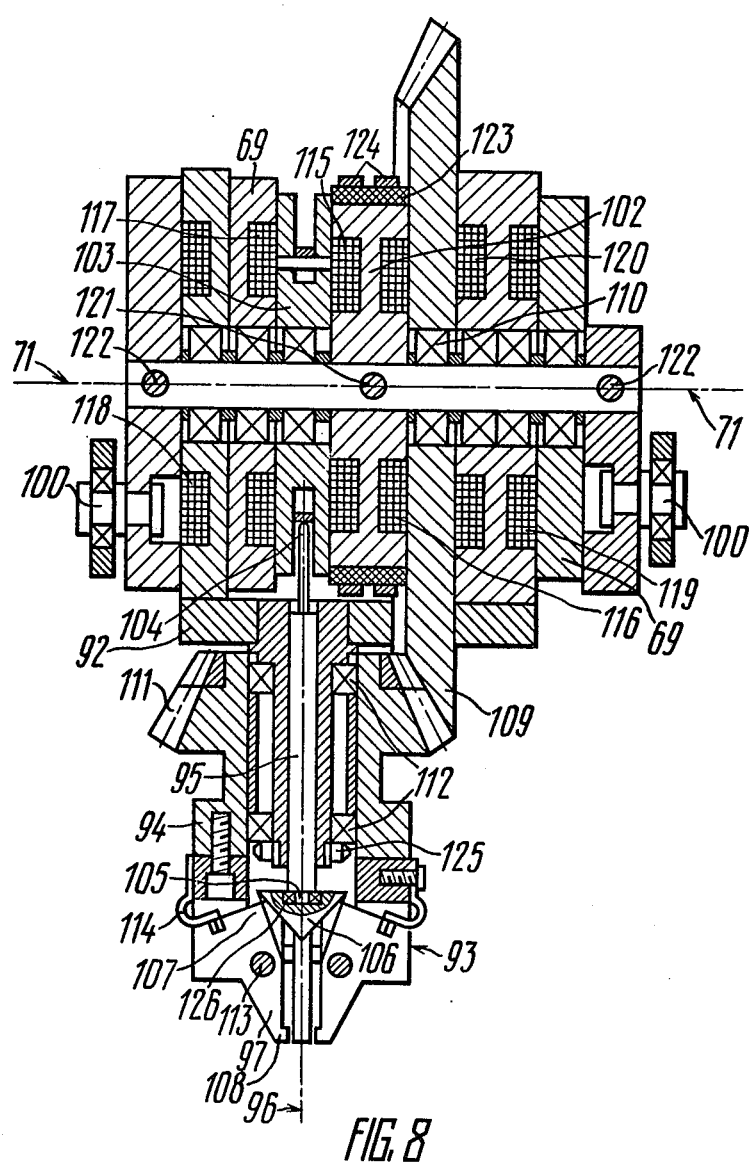
FIG. 8 is a general view of the mechanical wrist with finger clamp, according to the present invention, in longitudinal section.

The kinematic coupling of the fingers 97 with the axle 71 carrying the fork-like wrist 92 includes a disk 102 (FIG. 8) rigidly set on the axle 71 and an eccentric 103 designed to cooperate with one end 104 of the link rod 95 whose opposite end 105 has a coneshaped tip 106 designed to affect ends 107 of the fingers 97 opposite to ends 108 serving to clamp the parts.

The rotation of the clamp 93 relative to the axis 96 is effected owing to the kinematic coupling of the clamp 93 with the axle 71. This kinematic coupling includes a bevel wheel 109 set on the axle 71 through the intermediary of a bearing 110 and conjugated with a bevel gear 111 rigidly attached to the body 94 of the finger clamp 93.

The body 94 of the clamp 93 is connected to the wrist 92 via antifriction bearings 112. The fingers 97 are mounted, with a possibility of rotation, on axles 113 rigidly secured in the body 94 of the finger clamp 93.

In order to ensure the cooperation of the eccentric 103 with the end 104 of the link rod 95, provision is made for springs 114 attached with their one end to the body 94 of the finger clamp 93 and thrust with their other end against the ends 107 of the fingers 97 opposite to the ends 108 serving to clamp the parts.

The disk 102 carries electromagnetic clutches 115 and 116 mounted on the opposite sides of said disk 102 and designed to transmit rotation from the axle 71 to the eccentric 103 upon the clamping of parts or to the wheel 109 upon rotation of the body 94 of the clamp 93 about the axis 96.

For fixing the position of the eccentric 103 in the course of rotation of the axle 71, use is made of an electromagnetic clutch 117 mounted in recesses provided in the fork 69.

For transmitting the rotation of the fork-like wrist 92 about the axle 71 from said axle, use is made of an electromagnetic clutch 118 secured in recesses provided on the wrist 92.

For fixing the position of the wrist 92 in the course of rotation of the axle 71, use is made of an electromagnetic clutch 119 secured in a recess provided in the wrist 92.

For fixing the position of the bevel wheel 109 in the course of rotation of the axle 71, use is made of an electromagnetic clutch 120 mounted in a recess provided in the wrist 92.

Rigid attachment of the disk 102 to the axle 71 is ensured by the provision of a pin 121, and that of the eccentric pins 100 - by pins 122.

Mounted on the disk 102 with the aid of a spacer 123 are slip rings 124 which provide for switching-on and -off of the electromagnetic clutches 115 and 116.

For securing the bearings 112 on the wrist 92, provision is made of a nut 125.

A bearing 126 serves to ensure rotation of the cone-shaped tip 106, provided at the end 105 of the link rod 95, relative to the axis 96.

The herein disclosed device for locating in plane XOY the point A with preset coordinates operates in the following manner.

The preset coordinates x and y of the point A in the orthogonal system XOY are entered in a logic circuit or programmed-control system where the entered information is converted by a counter mechanism into two values of rotation angles $\alpha$ and $\beta$ of the axles 5 and 11, corresponding to the coordinates x and y.

The angles $\alpha$ and $\beta$ are determined from the formulae $$\alpha = 2 \text{ arc cos} \frac{\sqrt{x^2 + y^2}}{2r},$$

$$\beta = \text{arc cos} \frac{\sqrt{x^2 + y^2}}{2r}.$$

Following the selection of the requisite polar coordinates $\alpha$ and $\beta$, the drives 13 and 14 for rotation of the axles 5 and 11 are switched on.

Upon rotation of the axle 5, the carrier 4 and converter 15 are set into rotation, the satellite gear 3 and converter 16 being set into rotation from the axle 11. As a result, the pin 9 carrying the table 2 is moved towards the point A being located.

Following the rotation of the axles 11 and 5 through preset angles $\alpha$ and $\beta$ in accordance with the data of the converters 15 and 16, the braking electromagnetic clutches 17 and 18 are swtiched on to stop the rotation of the axles 11 and 5 in the required position upon locating the point A. Simultaneously, a signal is delivered for switching on the drives 13 and 14.

In this manner, the point A is located in plane XOY by two preset coordinates x and y.

The device of the invention for locating in space the point B with preset coordinates x, y and z operates in the following manner.

The preset coordinates x, y and z of the point B in orthogonal system XYZ are entered in a logic circuit or programmed-control system where the entered information is converted by a counter mechanism into three values of rotation angles $\alpha$, $\beta$ and $\gamma$ of the axles 40, 26 and 38, corresponding to the coordinates x, y and z.

The angles $\alpha$, $\beta$ and $\gamma$ are determined from the formulae $$\alpha = 2 \text{ arc cos} \frac{\sqrt{x^2 + y^2}}{2r},$$

$$\beta = \text{arc cos} \frac{\sqrt{x^2 + y^2}}{2r} + \text{arc tan} \frac{x}{y},$$

$$\gamma = \text{arc tan} \frac{z}{x}.$$

On selecting the polar coordinates $\alpha$, $\beta$ and $\gamma$, the drives 44, 42 and 43 are switched on for rotation of the axles 40, 26 and 38.

The axle 40 is set into rotation by the electric motor of the drive 44 via output shaft 62, gears 63 and 64, shaft 66, gear 67 and gear 24 rigidly set on the axle 40, while the converter 47 is set into rotation from the gear 64 via gear 68.

The axle 26 is set into rotation by the electric motor of the drive 42 via output shaft 52, gear 53 and gear 54 rigidly set on the axle 26, while the converter 45 is set to rotation from the gear 54 via gear 55.

The axle 38 is set into rotation by the electric motor 43 via output shaft 57, gear 58 and gear 59 rigidly set on the axle 38, while the converter 46 is set to rotation from the gear 59 via gear 60.

In the course of rotation of the axle 38, the body 27 of the planetary train is imparted rotation; in the course of rotation of the axle 26, the carrier 25 is imparted rotation; in the course or rotation of the axle 40, the satellite gear 24 is imparted rotation. As a result, the pin 36 is moved towards the point B being located and the arm 23 -towards the point B¹, the axle 71 being brought into coincidence with said point B¹.

Following the rotation of the axles 38, 26 and 40 through preset angles $\gamma$, $\beta$ and $\alpha$ in accordance with the data of the angular converters 46, 45 and 47, the braking electromagnetic clutches 49, 48 and 50 are switched on to stop the rotation of the axles 38, 26 and 40 in the required position upon locating the points B and B¹. Simultaneously, a signal is delivered for switching off the drives 43, 42 and 44.

In this manner, the point B is located in space by three preset coordinates x, y and z. After the selection of the requisite polar coordinates $\alpha$, $\beta$ and $\gamma$, the drive 73 is switched on to rotate the axle 71 for clamping parts and re-orienting them in space.

To this end, the drive 73 transmits rotation to the axle 71 via output shaft 74, gear 75, gear 76 rigidly set on the crankshaft 77, rods 82, crankshaft 84, rods 86, crankshaft 88, rods 72. Rotation from the axle 71 is imparted to the body 94 of the clamp 93 via gear 109 actuated by the electromagnetic clutch 116 operating alternately with the braking clutch 120, and a gear 111 rigidly attached to the body 94. Rotary movement from the axle 71 is transmitted to the wrist 92 via electromagnetic clutch 118 operating alternately with the clutch 119.

Motion from the axle 71 is also imparted to the disk 103 which moves the link rod 95, the motion being further imparted via cone-shaped tip 106 to the fingers 97. For the part to be clamped in the fingers 97, the electromagnetic clutch is switched on while the braking clutch 117 is switched off. The feedback between the motion of the fingers 97, rotation of the body 94 of the clamp 93 about the axis 96 and rotation of the wrist 92 about the axle 71 is effected from the angular converter 80 via crankshaft 77, rods 82, crankshaft 84, rods 86, crankshaft 88, rods 72 and axle 71.

In this manner, the clamping of a part (object) in the fingers 97 is effected, as well as the rotation of the clamped part in space about the axles 71 and 9, whereby the part can be re-oriented in space.

COMMERCIAL APPLICATIONS

The herein disclosed method for locating a point by its coordinates and a device for accomplishing said method can be used most advantageously when making and measuring several holes in a workpiece being machined, upon automatic replacement of tools in machines, upon transfer and removal of parts from equipment, in automating assembly and auxiliary operations.

We claim:

1. A method for locating point in space with preset coordinates in an orthogonal system comprising, selecting a base point ($A_o$) on one of the coordinate axes, moving the point along a conditional trajectory depending upon the coordinates of the preset base point, the positioning of the base point ($A_o$) being performed using polar coordinates alone, and ($\alpha$) of said coordinates being determined from the formula $$\alpha = 2 \text{ arc cos} \frac{\sqrt{x^2 + y^2}}{2r}$$

and another coordinate ($\beta$) -determined from the formula $$\beta = \text{arc cos} \frac{\sqrt{x^2 + y^2}}{2r} + \text{arc tan} \frac{x}{y},$$

where
- $\alpha$- is an angle or rotation of the point ($A_o$) positioned around a center (0) located at the middle of a segment ($OA_o$) between the center (0) or the orthogonal system (XOY) of coordinates and the base point ($A_o$);
- $\beta$- is an angle of rotation of the point ($A_o$) positioned around the center (0) of the orthogonal system (XOY) of coordinates between the center (0) of the orthogonal system (XOY) of coordinates and the base point ($A_o$);
- x - is the abscissa of the othogonal system of coordinates;
- y - is the ordinate of the orthogonal system of coordinates;
- r - is a radius of a circle whose center (0) is located at the middle of the segment ($OA_o$) between the center (0) of the orthogonal system (XOY) of coordinates and the base point ($A_o$), and in the course of positioning, the base point ($A_o$) is moved in accordance with said angles ($\alpha$ and $\beta$) relative to, respectively, the point (0) located at the middle of the segment ($OA_o$) between the center (0) of the orthogonal system (XOY) of coordinates and the base point ($A_o$), and the center (0) of the othogonal system (XOY) of coordinates.

2. A method as claimed in claim 1, wherein where the point to be located disposed at some distance from the preset plane accommodating the X- and Y-axes of the orthogonal system, a third coordinate (z) of a second preset point (B) is additionally preset, as well as a rotation axis (OZ) passing through the center (0) of orthogonal system (XYZ) of coordinates and point (0) located at the middle of a segment ($OB_o$) between said center (0) and point ($B_o$), the positioning of the point ($B_o$) involving the use of a third polar coordinate ($\alpha$) determined from the formula $$\alpha = \text{arc tan } (z/x),$$

where
- $\alpha$ - is an angle of rotation of the point ($B_o$) being positioned around the axis passing through the center (0) of the orthogonal system (XYZ) of coordinates and perpendicular to the X-axis;
- z - is a coordinate of the orthogonal system of coordinates;
- x - is an abscissa of the orthogonal system of coordinates;

and, in the course of positioning, the point ($B_o$) being positioned is moved in accordance with said angle ($\alpha$) around said rotation axis (OZ).

3. A device for accomplishing the method of claim 1, comprising, a stationary base (1), a drive mechanical arm (2) coupled to the stationary base (1), means for coupling said mechanical arm to said stationary base comprising a planetary train including a satellite gear (3) and a carrier (4) having a rotation axle (5) secured in the planetary train and characterized in that it comprises rigidly interconnected four-link parallelograms (6 and 7) of which one (7) is pivoted to the arm (2) and the other one (6) - to the planetary train pivots pivotally connected the one parallelogram respectively to said arm and said other to said parallelogram planetary train, the rotation axle (5) of the carrier (4) passing through the center (0) of the orthogonal system (XOY) of coordinates and secured in the stationary base (1), and the satellite gear (3) of the planetary train having rigidly attached thereto a pin (9) articulated to the mechanical arm (2) and disposed to ensure the movement of the arm in a plane accommodating the point being positioned.

4. A device as claimed in claim 3, characterized in that it comprises another carrier, an axle for rotation of said another carrier, an axle (38) passing through center (0) of orthogonal system (XYZ) of coordinates at right angles to said rotation axle (26) of said another carrier (27), said axle (38) having a body (27) of the planetary train, rigidly attached thereto, and being pivoted to a stationary base (22).

5. A device as claimed in claims 3 or 4, including another mechanical arm, a fork (69) rigidly attached to said another mechanical arm (23), an axle (71) rotational on ends of said fork, a drive, said axle carrying at the ends thereof rods (72) transmitting to said axle (71) rotation from said drive (73) said drive being mounted on the body (27) of the planetary train and further carrying a fork-like mechanical wrist (92) secured by its ends (91) to said axle (71) for turning relative to the latter until thrust against the fork (69), said wrist carrying a finger clamp (93) having a body (94), a link rod (95) passing through the body of said finger clamp and having a geometric axis (96) perpendicular to the axle (71) carrying the fork-like wrist (92) and coupled to the wrist (92) for rotation about the geometric axis (96), fingers (97) of the clamp (93) being kinematically coupled to the axle (71) carrying the fork-like wrist (92) to ensure their turning through an angle sufficient for clamping and releasing a part.

6. A device as claimed in claim 5, in which the axle (71) carrying the rods (72) is mounted in the fork (69), antifriction bearings (101) mounting the last-mentioned axle on the fork.

7. A device according to claim 5, in which said rods (72) are mounted on the axle (71) means for mounting said rods on the last-mentioned axle comprising antifriction bearings (99) and eccentric pins (100) rigidly attached to the last-mentioned axle (71) and spaced apart relative to the latter through an angle equal to 90°.

8. A device as claimed in claim 5, in which the ends (91) of the fork-like wrist (92) are secured on said axle (71) carrying the rods (72).

9. A device as claimed in claim 5, in which the axle (71) carrying the fork-like wrist (92) has rigidly secured thereto a disk 102 having electromagnetic clutches (115, 116) mounted on opposite sides thereof, and an eccentric (103) disposed to cooperate with one end (104) of a link rod (95) whose other end (105) has a cone-shaped tip (106) to actuate ends (107) of the fingers (97) opposite to free ends (108) thereof effective to clamp a part, springs (114) attached to the body (94) of the finger clamp (93) and thrust against the ends (107) of the fingers (97) opposite to the free ends (108) effective to the clamp the part to ensure said eccentric cooperates with said one end of said link rod.

10. Apparatus for moving a point in space to a selected position point positioned in space in a position defined by an orthogonal system of coordinates comprising, an arm having the point to be moved defined thereon, a planetary system having a carrier rotational about an axis of rotation disposed at a stationary point of origin of the coordinate system, a satellite gear mounted rotationally on the carrier and transported rotationally by the carrier when it rotates, first means to drive the carrier rotationally about the axis of rotation thereof a selected angle of rotation selected in dependence upon the position point selected in the system of coordinates, a second drive for driving the satellite gear rotationally about the axis of rotation thereof, a selected angle of rotation selected in dependence upon the position selected for said position point and the angle of rotation of the carrier, the arm having a first part moved in a plane in which said position point is disposed in the orthogonal system of coordinates, means pivotally connecting said first part to said satellite gear, the arm having a pair of articulated rigid parallelograms one of which is mounted to rotate about a stationary axis and the other connected to said first part, both the axes of rotation being parallel, and means to stop the rotation of the carrier and the rotation of said satellite gear independently when each as rotated the corresponding angle of rotation, whereby said point is moved to said position point solely by rotational movements.

11. Apparatus for moving a point in space to a selected position point positioned in space in a position defined by an orthogonal system of coordinates according to claim 10, in which said first part is a table, and including a pin on said satellite gear pivotally interconnecting the table thereto for transporting the table as the carrier and the satellite gear rotate.

12. Apparatus for moving a point in space to a selected position point positioned in space in a position defined by an orthogonal system of coordinates according to claim 11, including a fork mechanism on said arm for gripping and holding a part, and means for selectively activating the gripping and release of a part by said fork mechanism.

13. Apparatus for moving a point in space to a selected position point positioned in space in a position defined by an orthogonal system of coordinates according to claim 10, in which the coordinates are selected and said angles of rotation are selected according to a method of claim 1.

14. Apparatus for moving a point in space to a selected position point positioned in space in a position defined by an orthogonal system of coordinates comprising planetary systems having three independent axis of rotation in three different planes disposed in a system of coordinates defining an x, y, z system of coordinates, means for rotating the planetary systems each a given different angle of rotation selected in dependence upon the position to which said point is to be moved, an arm defining said point connected at one end to one of the planetary systems, two four-link parallelograms, one of said parallelograms rotationally connected to another of said planetary systems, the other of said parallelograms connected to said arm, means connecting ends of the two parallelograms, whereby rotation of said system about their independent axis of rotation moves a free end of said arm in three dimensions in space.

15. Apparatus for moving a point in space to a selected position point positioned in space in a position by an orthogonal system of coordinates according to claim 14, in which gripper means operable for gripping and releasing parts is mounted on the free end of said arm for transporting parts in three dimensions to the position point.

16. A method for locating a point with preset coordinates x and y in an orthogonal system of coordinates, having a coordinate axis X and a coordinate axis Y, comprising the following operations:

locating a base point on one of the coordinate axes at a distance from the center of said orthogonal system of coordinates which at least equals the coordinate of the sought-for point lying on that coordinate axis on which the base point is located;

locating on the same said coordinate axis on which the base point is located, a point defining a center of rotation of said base point, said center of rotation being disposed at the middle of said distance between said center of the orthogonal system of coordinates and said base point;

conversion of the coordinates x and y of the sought-for point, respectively, into the angles $\alpha$ and $\beta$ of rotation of said base point, said angles being determined from the following dependencies:

$$\alpha = 2 \text{ arc cos} \frac{\sqrt{x^2 + y^2}}{2r},$$

$$\beta = \text{arc cos} \frac{\sqrt{x^2 + y^2}}{2r} + \text{arc tan} \frac{x}{y},$$

where
- $\alpha$ - is an angle of rotation of said base point around said center of its rotation;
- $\beta$ - is an angle of rotation of said base point around said center of said system of coordinates;
- r - is half the distance from the center of said orthogonal system of coordinates to said base point;

moving said base point around said center of rotation through an angle $\alpha$; and moving said base point around the center of said orthogonal system of coordinates through an angle $\beta$.

17. A method as claimed in claim 16, wherein the sought-for point has one more preset coordinate z in said orthogonal system of coordinates which has said one more coordinate axis Z;

the coordinate z of the sought-for point is converted into an angle of rotation $\gamma$ of said base point according to the following dependence:

$$\gamma = \text{arc tan } (z/x),$$

where
- $\gamma$ - is an angle of rotation of said base point around said coordinate axis Z;
- z - is a coordinate of said orthogonal system of coordinates; and moving said base point around said coordinate axis Z through an angle $\gamma$.

18. A device for locating a point with preset coordinates x and y in an orthogonal system of coordinates, comprising:

a planetary train, said planetary train comprising a body, a carrier having a rotation axle pivotally secured in said body of the planetary train, said rotation axle providing as a center of said orthogonal system of coordinates around which the point is moved through an angle $\beta$, said point being a base point for locating a sought-for point with the preset coordinates x and y in the orthogonal system of coordinates, said planetary train including a satellite gear having a body rigidly connected to said rotation axle of said carrier, a rotation axle which is pivotally secured in the last-mentioned body and which serves as a center of rotation through an angle $\alpha$ of the point which is a base point for locating a sought-for point with the preset coordinates x and y in the orthogonal system of coordinates, and a pin rigidly connected to the rotation axle of said satellite gear, the center of said pin corresponding to the base point;

a mechanical arm pivoted on the pin;

a first four-link parallelogram articulated with two joints thereof to the mechanical arm;

a second four-link parallelogram articulated to retaining two joints of the first aforesaid four-link parallelogram, and the second four-link parallelogram having two other joints articulated to said body of said planetary train.

19. A device as claimed in claim 18, which comprises:

a stationary base;

an axle, pivotally secured to said stationary base, rigidly connected to the body of the planetary train, and having a geometric axis passing through said axle of the carrier, said geometric axis being a coordinate axis in the orthogonal system of coordinates around which is moved said body of the planetary train through an angle $\alpha$.

20. A device as claimed in claim 19, which comprises:

a fork rigidly attached on said mechanical arm;

an axle rotatably mounted at the ends of said fork;

rods mounted at the ends of said axle;

a drive mounted on said body of said planetary train, said drive being rod-connected to the last-mentioned axle for transmitting rotation to the latter;

a fork-like mechanical wrist pivotally secured on said last-mentioned axle mounted on said fork for said wrist having a possibility of turning relative to said last-mentioned axle until it thrusts against the fork;

a finger clamp comprising fingers and a body having a stationary portion rigidly attached to said fork-like wrist, and a movable portion carrying said fingers kinematically coupled to the last-mentioned axle to clamp and release an object with said fingers, and kinematically coupled to said last-mentioned axle for turning said fingers to reorient the object.

21. A device as claimed in claim 20, which comprises:

a disk rigidly secured on said axle;

a first electromagnetic clutch mounted in said disk;

an eccentric pivotally secured on said axle mounted on said axle mounted on said fork and having means for cooperating with said electromagnetic clutch for transmitting rotation from said axle mounted on said fork to said eccentric;

a second electromagnetic clutch mounted in said fork and having means for cooperating with said eccentric to fix the latter;

a link rod having a first end thrusting against an eccentric surface of said eccentric, and a second end;

a cone-shaped tip mounted on the second end of said link rod and to actuate ends of said fingers opposite to the ends of said fingers effective to clamp and release said object.

* * * * *